US009592905B2

(12) United States Patent
Ribarov et al.

(10) Patent No.: US 9,592,905 B2
(45) Date of Patent: Mar. 14, 2017

(54) FUEL INTELLIGENT CROSSFEED VALVE FOR DETECTING LEAKAGE IN AIRCRAFT FUEL TANKS

(71) Applicant: HAMILTON SUNDSTRAND CORPORATION, Charlotte, NC (US)

(72) Inventors: Lubomir A. Ribarov, West Hartford, CT (US); Leo J. Veilleux, Jr., Wethersfield, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 206 days.

(21) Appl. No.: 14/531,599

(22) Filed: Nov. 3, 2014

(65) Prior Publication Data

US 2016/0122004 A1    May 5, 2016

(51) Int. Cl.
| F02B 3/00 | (2006.01) |
| B64C 17/10 | (2006.01) |
| F16K 37/00 | (2006.01) |
| B64D 37/02 | (2006.01) |
| F16K 11/07 | (2006.01) |

(52) U.S. Cl.
CPC .............. B64C 17/10 (2013.01); B64D 37/02 (2013.01); F16K 11/07 (2013.01); F16K 37/0041 (2013.01)

(58) Field of Classification Search
CPC ...... B64C 17/10; B64D 37/02; F16K 37/0041
USPC ............... 137/265, 625.26, 533, 544, 625.18
See application file for complete search history.

(56) References Cited

U.S. PATENT DOCUMENTS

| 5,403,155 A | * | 4/1995 | Head ....................... B64C 27/56 244/197 |
| 8,042,568 B2 | * | 10/2011 | Clausen ................ F15B 11/006 137/554 |
| 2007/0079879 A1 | * | 4/2007 | Murrenhoff ......... F15B 13/0402 137/554 |
| 2007/0084511 A1 | * | 4/2007 | Johnson .................. B64C 17/10 137/265 |

* cited by examiner

Primary Examiner — Mary McManmon
Assistant Examiner — Angelisa L Hicks
(74) Attorney, Agent, or Firm — Snell & Wilmer L.L.P.

(57) ABSTRACT

A fuel management system may include a first fuel tank and a second fuel tank. The fuel management system may also include an intelligent crossfeed valve positioned between the first fuel tank and the second fuel tank and configured to allow fuel to flow between the first fuel tank and the second fuel tank. The fuel management system may also include a sensor configured to detect an amount to which the intelligent crossfeed valve is open. The fuel management system may also include an engine controller connected to the sensor and configured to cause the intelligent crossfeed valve to close in response to the intelligent crossfeed valve being open a third predetermined amount.

15 Claims, 7 Drawing Sheets

FUEL INTELLIGENT CROSSFEED VALVE FOR DETECTING LEAKAGE IN AIRCRAFT FUEL TANKS

FIELD

The present disclosure relates to aircraft fuel systems, and more particularly to intelligent crossfeed valves of aircraft systems.

BACKGROUND

Fuel systems on an aircraft may include multiple fuel tanks to provide fuel to multiple engines. Some aircraft include a crossfeed valve for allowing fuel to transfer between the aircraft's main fuel tanks. The crossfeed valve may be used to ensure an equal mass of fuel is present on each side of the aircraft. The purpose of the crossfeed valve is to maintain proper aircraft stability, balance and orientation (i.e., "flight attitude") as fuel is consumed by the aircraft's engines during flight.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A fuel management system may include a first fuel tank and a second fuel tank. The fuel management system may also include an intelligent crossfeed valve positioned between the first fuel tank and the second fuel tank and configured to allow fuel to flow between the first fuel tank and the second fuel tank. The fuel management system may also include a sensor configured to detect an amount to which the intelligent crossfeed valve is open. The fuel management system may also include an engine controller connected to the sensor and configured to cause the intelligent crossfeed valve to close in response to the intelligent crossfeed valve being open a third predetermined amount.

Also described is an intelligent crossfeed valve for use in a fuel management system, the fuel management system having a first fuel tank and a second fuel tank. The intelligent crossfeed valve includes a first valve window configured to receive fuel from the first fuel tank. The intelligent crossfeed valve also includes a second valve window in fluid communication with the first valve window and configured to provide fuel to the second fuel tank. The intelligent crossfeed valve also includes a third valve window configured to receive fuel from the second fuel tank. The intelligent crossfeed valve also includes a fourth valve window in fluid communication with the third valve window and configured to provide fuel to the first fuel tank. The intelligent crossfeed valve also includes a shaft moveably positioned within the intelligent crossfeed valve and configured to allow fuel to flow from the first fuel tank through the first valve window and the second valve window to the second fuel tank and from the second fuel tank through the third valve window and the fourth valve window to the first fuel tank based on a position of the shaft. The intelligent crossfeed valve also includes a position sensor configured to detect the position of the shaft.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
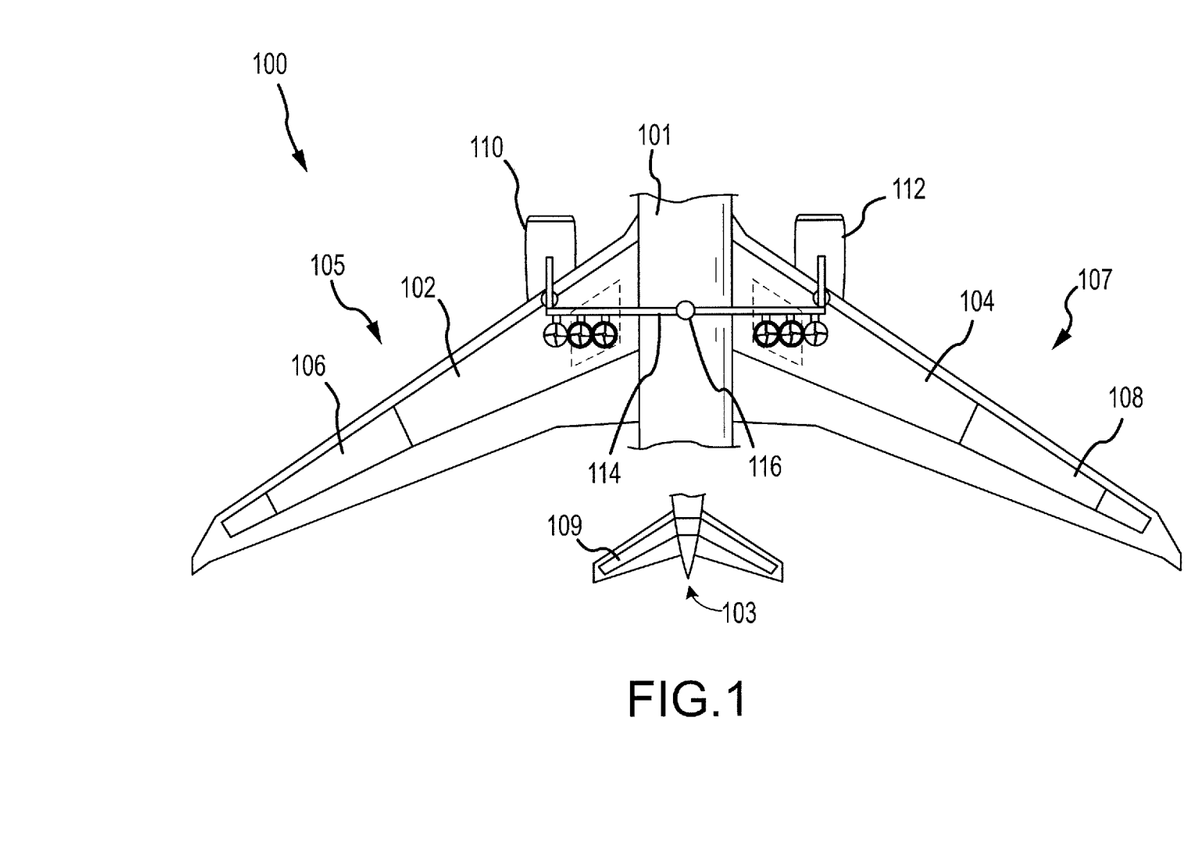
FIG. 1 illustrates components of a fuel management system within an aircraft, in accordance with various embodiments.

FIG. 1 illustrates components of a fuel management system within an aircraft 100. In aircraft 100, forward and aft positions lie along an axis of fuselage 101. For example, an intelligent crossfeed valve 116 may be referred to as forward of a tail 103 and tail 103 may be referred to as aft of intelligent crossfeed valve 116. As used herein, the right side of aircraft 100 refers to the right hand side (starboard) of aircraft 100 as viewed by a person on board the aircraft who is facing forward and the left side of aircraft 100 refers to the left hand side (port) of aircraft 100 as viewed by a person on board the aircraft who is facing forward. Aircraft 100 may include a fuselage 101, a tail 103 at an aft end of fuselage 101, a left wing 105 on the left side (port) of aircraft 100 and a right wing 107 on the right side (i.e., starboard) of aircraft 100. Aircraft 100 also includes a left (port) engine 110 ("Engine 1") on the left side (port) of aircraft 100 and a right (starboard) engine 112 ("Engine 2") on the right side (starboard) of aircraft 100.

Left wing 105 includes left inner fuel tank 102 and left outer fuel tank 106, each capable of containing fuel for aircraft 100. Left inner fuel tank 102 may be a main fuel tank of aircraft 100. Left outer fuel tank 106 may be a main fuel tank or may be a backup fuel tank of the aircraft 100. Right wing 107 includes right inner fuel tank 104 and right outer fuel tank 108, each capable of containing fuel for aircraft 100. Right inner fuel tank 104 may be a main fuel tank of aircraft 100. Right outer fuel tank 108 may be a main fuel tank or may be a backup fuel tank of aircraft 100. Tail 103 includes a trim tank 109 capable of containing fuel for aircraft. Trim tank 109 may be a main fuel tank of aircraft 100 or may be a backup fuel tank of aircraft 100.

The discussion herein is directed to an aircraft having two main fuel tanks and an intelligent crossfeed valve between the two main fuel tanks. However, this disclosure is not limited to aircraft having only two main fuel tanks. Instead, the systems and methods described herein, as it will readily be known to one skilled in the art, can be applied to an aircraft having any number of main fuel tanks such that an intelligent crossfeed valve may be in fluid communication with more than two main fuel tanks allowing the transfer of fuel between all three main fuel tanks. This disclosure is not limited to an aircraft with two engines. Instead, the systems and methods described herein, as it will be readily known to one skilled in the art, can be applied to an aircraft having any number of main engines. The systems and methods described herein may also be applied to an aircraft having more than two fuel tanks such that at least two intelligent crossfeed valves may each be in fluid communication with at least two fuel tanks. Other configurations are equally plausible and are contemplated in this disclosure.

Left engine 110 is positioned adjacent left wing 105 and may be attached to left wing 105. Left engine 110 receives fuel directly from left inner tank 102. Right engine 112 is positioned adjacent right wing 107 and may be attached to right wing 107. Right engine 112 receives fuel directly from right inner tank 104.

Left inner tank 102 and right inner tank 104 are attached via a pipe 114. Pipe 114 may be any pipe through which fuel may be displaced. An intelligent crossfeed valve 116 may be positioned within or external to pipe 114 between left inner fuel tank 102 and right inner fuel tank 104. Intelligent crossfeed valve 116 may allow fuel to transfer between left inner fuel tank 102 and right inner fuel tank 104. When intelligent crossfeed valve 116 is in an open position, fuel may flow freely between left inner fuel tank 102 and right inner fuel tank 104. When intelligent crossfeed valve 116 is in a closed position, fuel may not transfer between left inner fuel tank 102 and right inner fuel tank 104. Intelligent crossfeed valve 116 may be partially open to varying degrees such that a various amount of fluid may be displaced from/to left inner fuel tank 102 and from/to right inner fuel tank 104 based on the position of intelligent crossfeed valve 116, and the amount of fuel that may be displaced is based on the amount to which intelligent crossfeed valve 116 is open. For example, intelligent crossfeed valve 116 may allow a maximum displacement of fuel when intelligent crossfeed valve 116 is fully open. When partially open, intelligent crossfeed valve 116 may allow a displacement of fuel that is less than the maximum amount and is based on the amount to which crossfeed valve 116 is open. Controls to open, close or partially open intelligent crossfeed valve 116 may be received from a pilot and/or from a controller, such as engine control 506 illustrated in FIG. 5.

Figure 2:
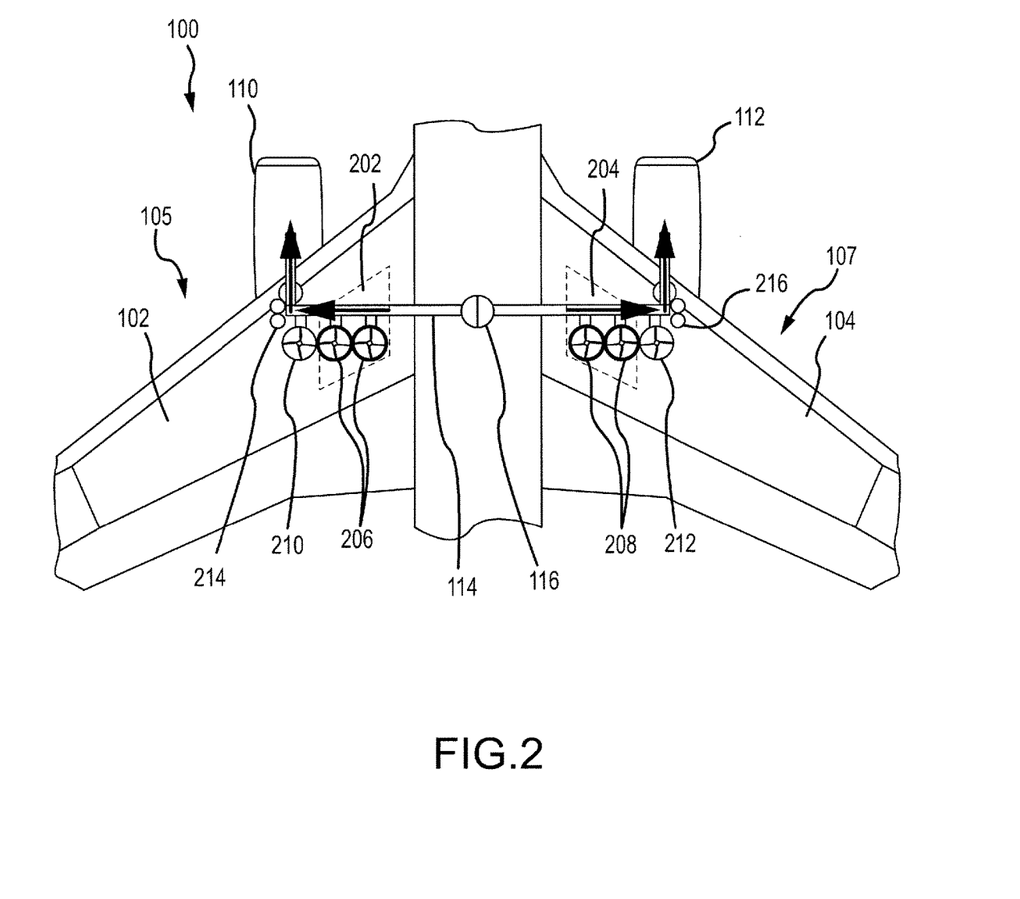
FIG. 2 illustrates an enlarged view of a portion of the aircraft of FIG. 1, in accordance with various embodiments.

FIG. 2 illustrates an enlarged view of a portion of aircraft 100. Left inner fuel tank 102 includes a collector cell 202. Within collector cell 202 are two left main fuel pumps 206. Collector cell 202 may receive fuel from left inner fuel tank 102 and provide fuel to left main fuel pumps 206. Collector cell 202 may be adapted to remain full of fuel throughout a flight. This allows left main fuel pumps 206 to remain pressurized. Left wing 105 also includes a left standby fuel pump. Left standby fuel pump 210 is positioned outside of collector cell 202. Fuel may be supplied to left engine (Engine 1) 110 via left main fuel pumps 206 and/or left standby fuel pump 210.

Left main fuel pumps 206 and left standby fuel pump 210 may be electrically powered fuel pumps. Left inner fuel tank 102 may also include a left mechanical fuel pump 214. Left mechanical fuel pump 214 may be mechanically powered (for example, via a gearbox driveshaft of left engine (Engine 1) 110) such that it can provide fuel to left engine (Engine 1) 110 in the case of electrical power failure. Left mechanical fuel pump 214 is positioned outside of collector cell 202.

Right inner tank 104 includes a collector cell 204. Collector cell 204 may operate in the same fashion as collector cell 202. Within collector cell 204 may be two or more right main fuel pumps 208. Right main fuel pumps 208 act in a similar fashion to left main fuel pumps 206. Right inner fuel tank 104 may also include a right standby fuel pump outside of collector cell 204. Right standby fuel pump 212 may act in a similar fashion to left standby fuel pump 210. Right inner fuel tank 104 may also include a right mechanical fuel pump 216. Right mechanical fuel pump 216 may act in a similar fashion to left mechanical fuel pump 214 and may be mechanically powered (for example, via a gearbox driveshaft of right engine (Engine 2) 112).

FIG. 2 illustrates aircraft 100 in a normal operation configuration. In FIG. 2, intelligent crossfeed valve 116 is in a closed position. This closed position of intelligent crossfeed valve 116 prevents fuel from being displaced between left inner fuel tank 102 and right inner fuel tank 104. In this configuration, left engine (Engine 1) 110 receives fuel directly from left fuel inner tank 102 and right engine (Engine 2) 112 receives fuel directly from right inner fuel tank 104. As illustrated in FIG. 2, the left engine (Engine 1) 110 and the right engine (Engine 2) 112 are both operational and running.

Figure 3:
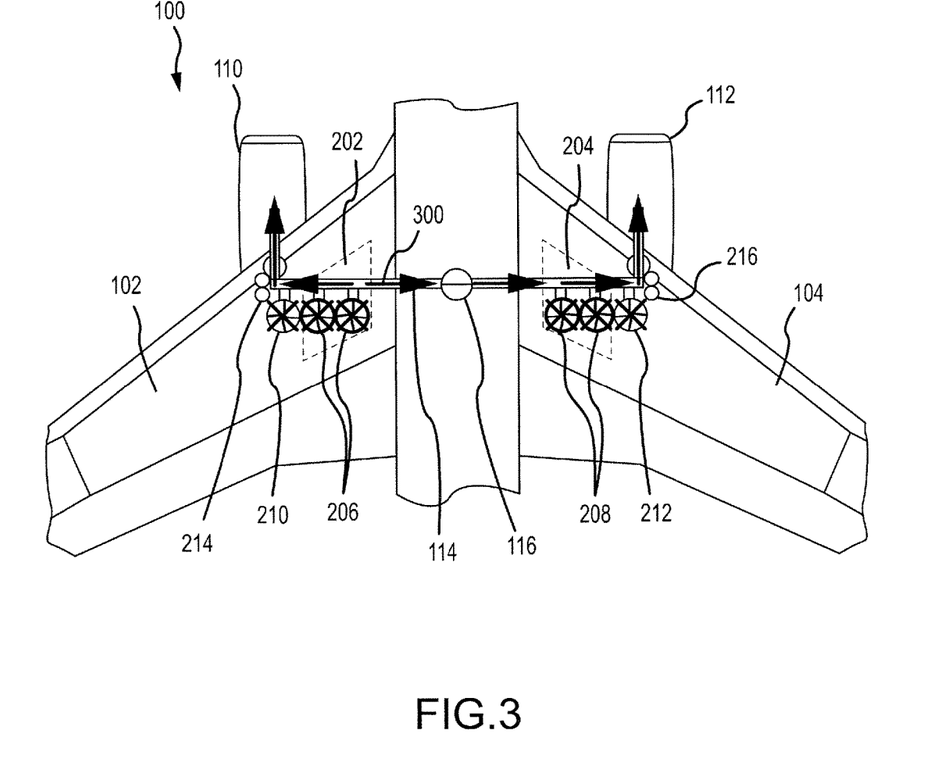
FIG. 3 illustrates an aircraft in a state in which a right inner fuel tank is empty and all electrical fuel pumps are not operational, in accordance with various embodiments.

FIG. 3 illustrates an aircraft 100 in a state in which right inner fuel tank 104 is empty and all electrical fuel pumps are failed (i.e., they are non-operational). In FIG. 3, left mechanical fuel pump 214 and right mechanical fuel pump 216 are operational. Additionally, left engine (Engine 1) 110 and right engine (Engine 2) 112 are both operational.

In FIG. 3, right inner fuel tank 104 is empty and fuel from left inner fuel tank 102 may be used to provide fuel to both left engine (Engine 1) 110 and right engine (Engine 2) 112. In order to accommodate this transfer of fuel, intelligent crossfeed valve 116 is opened. This allows fuel to be transferred from left inner fuel tank 102 to right engine (Engine 2) 112. Left mechanical fuel pump 214 may pump fuel to left engine (Engine 1) 110 directly from left inner fuel tank 102. Right mechanical fuel pump 216 receives fuel via left inner fuel tank 102 via intelligent crossfeed valve 116. Fuel from left inner fuel tank 102 is pumped via right mechanical fuel pump 216 through pipe 114 and through open intelligent crossfeed valve 116. This fuel is then provided to right engine (Engine 2) 112. FIG. 3 therefore illustrates how left inner fuel tank 102 can provide fuel to both left engine (Engine 1) 110 and right engine (Engine 2) 112. Aircraft 100 can operate in a similar fashion in the state in which left inner fuel tank 102 is empty and right inner fuel tank 104 still includes fuel. Aircraft 100 may perform optimally when there is no significant weight imbalance between left inner fuel tank 102 and right inner fuel tank 104. Therefore, intelligent crossfeed valve 116 may be instructed to modulate fuel between left inner fuel tank 102 and right inner fuel tank 104 as needed to maintain proper safe aircraft flight attitude.

In FIG. 3, arrows 300 indicate the direction of fuel flow from left inner fuel tank 102 to both left engine (Engine 1) 110 and right engine (Engine 2) 112. In FIG. 3, there is no fuel leak present.

Figure 4:
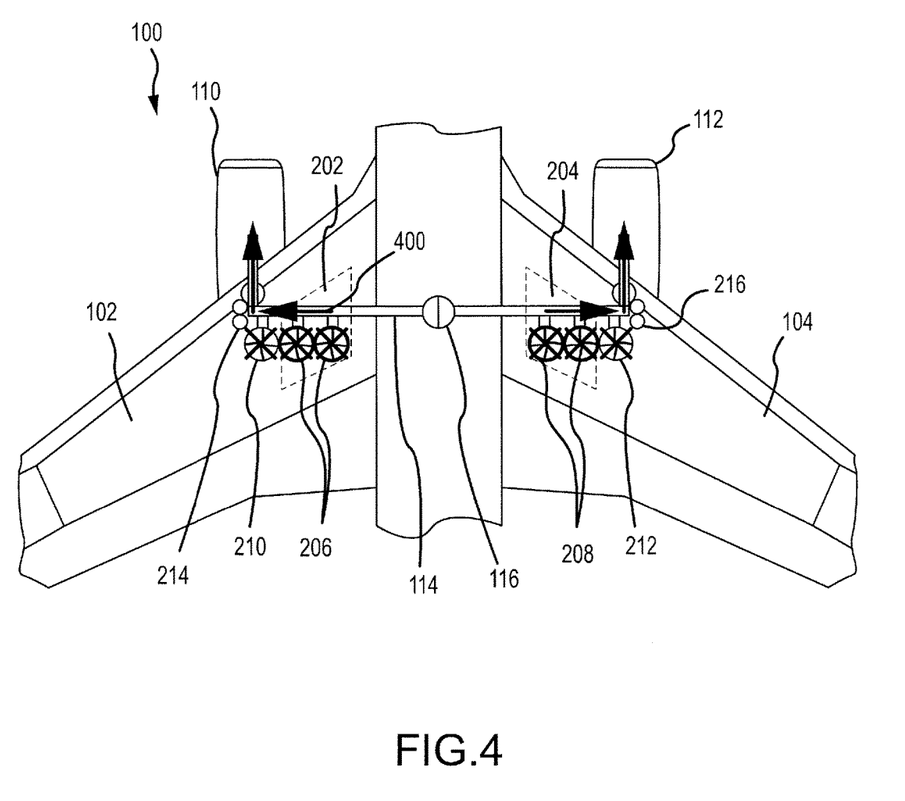
FIG. 4 illustrates an aircraft in a state in which a right inner fuel tank is empty, no electrical fuel pumps are operational and the right inner fuel tank is leaking fuel, in accordance with various embodiments.

FIG. 4 illustrates aircraft 100 in a state in which right inner fuel tank 104 is nearly empty, no electrical fuel pumps are operational and right inner fuel tank 104 is leaking fuel. In a state similar to the state illustrated in FIG. 4, if a crossfeed valve were to allow fuel to flow from left inner fuel tank 102 to right inner fuel tank 104 in response to a determination that right inner fuel tank 104 is nearly empty, fuel would be lost because of the fuel leak in right inner fuel tank 104.

Intelligent crossfeed valve 116, however, is intelligently controlled to prevent this fuel loss. Intelligent crossfeed valve 116 may determine that the fuel leak is present. Controls may then cause intelligent crossfeed valve 116 to close such that fuel may not be displaced between the full left inner fuel tank 102 and the leaking/nearly empty right inner fuel tank 104.

In the state illustrated in FIG. 4, left engine (Engine 1) 110 will be operating and provided fuel via left mechanical fuel pump 214 directly from left inner fuel tank 102. Right engine (Engine 2) 112 will be not be provided fuel because right inner fuel tank 104 is leaking and nearly empty and intelligent crossfeed valve 116 is closed. This prevents fuel from being displaced from left inner fuel tank 102 to right inner fuel tank 104 where it may leak out of aircraft 100. A fuel leak indicator may be activated in response to a determination of the fuel leak.

Figure 5:
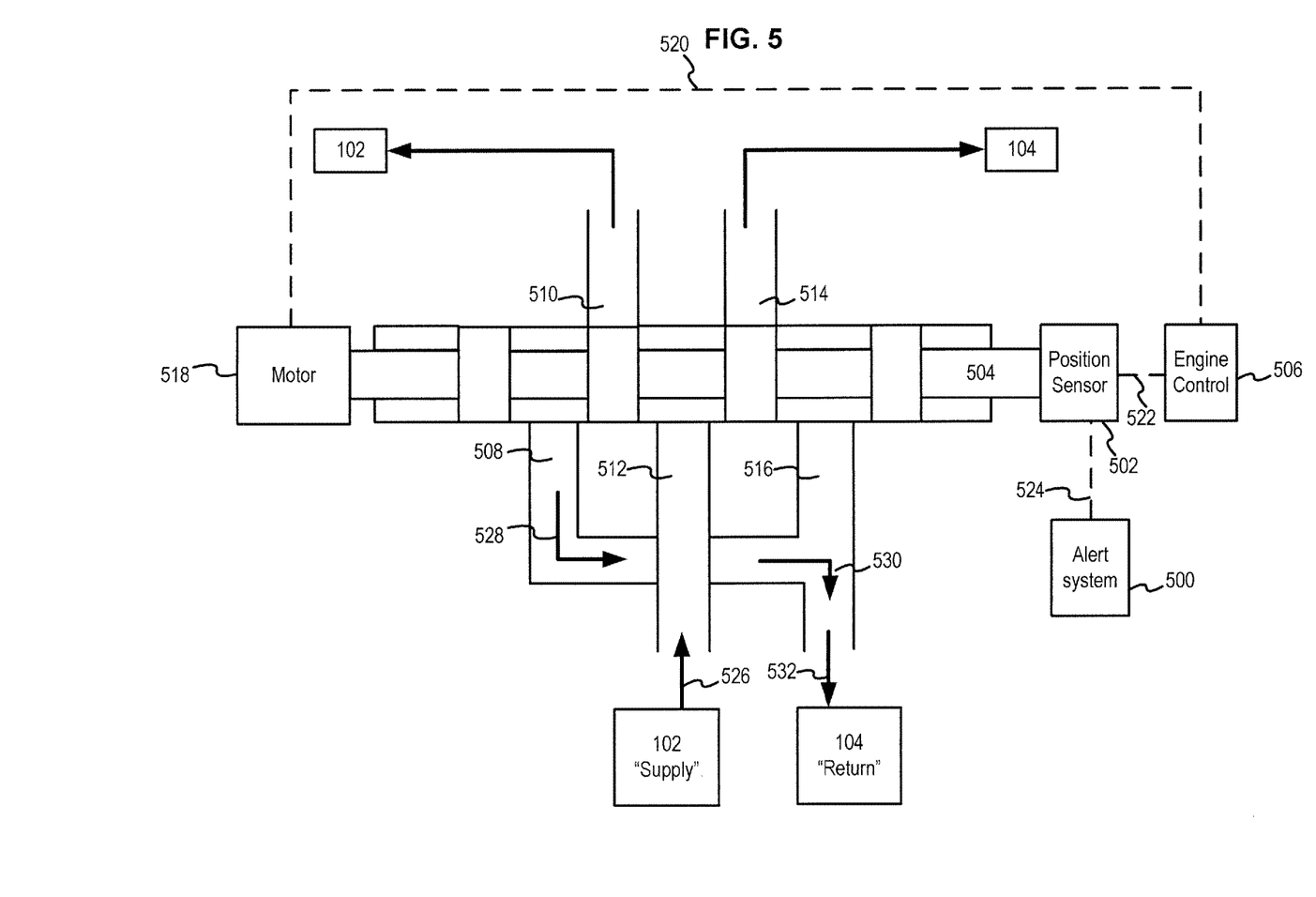
FIG. 5 illustrates a block diagram of a fuel management system, in accordance with various embodiments.

FIG. 5 illustrates a block diagram of a fuel management system. Intelligent crossfeed valve 116 may be a mechanical valve, such as a spool servo valve, having a shaft 504 and valve window 508, 510, 512, 514 and 516. A position sensor 502 may determine the operating status of intelligent crossfeed valve 116. The operating status may include whether intelligent crossfeed valve 116 is open, closed, or partially open, and if partially open, an indication of the degree to which intelligent crossfeed valve 116 is open. Shaft 504 may be moveably positioned within intelligent crossfeed valve 116 via motor 518, such as a torque motor. For example, a position sensor 502 may determine the position of shaft 504 within intelligent crossfeed valve 116 and determine an amount to which intelligent crossfeed valve 116 is open based on the position of shaft 504. The amount to which intelligent crossfeed valve 116 is open may indicate that intelligent crossfeed valve 116 is open, closed or any position within open and closed. Position sensor 502 may communicate with an alert system 500 of the aircraft 100, as illustrated by connection 524. Position sensor 502 may communicate with an engine control 506, as illustrated by connection 522. Engine control 506 may communicate with motor 518, as illustrated by connection 520. Connection 520 may represent a closed feedback loop connection. Engine control 506 may cause motor 518 to modulate intelligent crossfeed valve 116 as needed.

Valve window 508 may be in fluid communication with right inner fuel tank 104. Valve window 510 may be in fluid communication with left inner tank 102.

Initially, during normal operation, intelligent crossfeed valve 116 is balanced via equal pressures from left inner fuel tank 102 and right inner fuel tank 104. The "supply" pressure fuel from left inner fuel tank 102 flows through window 512 to the intelligent crossfeed valve 116, as indicated by arrow 526. This pressure is balanced by the "return" pressure fuel flow from right inner fuel tank 104 flowing out of intelligent crossfeed valve 116 via windows 508 and 516, as indicated by arrows 528, 530 and 532. Shaft 504 remains in this initial position.

When pressure from right inner fuel tank 104 is lower than the "supply" pressure from left inner fuel tank 102, motor 518 causes shaft 504 to be displaced to the right, partially opening window 514. In response, higher supply pressure from window 512 flows into window 514 thus filling right inner fuel tank. This continues until the "supply" pressure from left inner fuel tank 102 is equalized by the "return" pressure from the right inner fuel tank. The converse action occurs when fuel pressure from left inner fuel tank 102 is lower than the fuel pressure from right inner fuel tank 104.

Intelligent crossfeed valve 116 can be any type of valve, such as, but not limited to, single/double-jet flapper valve, jet pipe valve, or the like. Intelligent crossfeed valve 116 can have any specific design configuration for its lands and ports relations such as, but not limited to, open center (land width<port width), critical center (land width=port width) and/or closed center (land width>port width). The disadvantages of open center spool valves are increased flow gain near null position and power loss at null position due to center flow. The disadvantages of closed center spool valves are significant deadband at null position and associated diminished operational stability. Hence, it may be optimal to utilize a critical center four-land four-way spool valve.

Linear ports are optimum from a perspective of maintaining good servo valve performance over a broad operating range. Usage of such ports (i.e., rectangular, square) ensures linear flow gain. Non-linear shaped ports (i.e., circular) may also be allowed, however, one must understand well the risk on system performance stability when such nonlinear shaped ports are used.

Other design related criteria for spool valves such as steady state flow force compensation, number and position of pressure equalizing grooves, maximum valve stroke, etc., may also be considered in the specific selection of the optimal spool valve application. We are neutral to any of these selections as long as the proper design criteria are met that optimize the performance of intelligent crossfeed valve 116.

When shaft 504 is positioned within valve window 508 and 510 fuel may be displaced from right inner tank 104 to left inner tank 102. In particular, fuel may flow from right inner tank 104 through valve window 508 where it may travel via shaft 504 to valve window 510. As valve window 510 is in fluid communication with left inner tank 102, the fuel then travels from valve window 510 to left inner tank 102.

Similarly, valve window 512 is in fluid communication with left inner tank 102, and valve window 514 is in fluid communication with right inner tank 104. When shaft 504 is positioned within valve window 512 and 514, fuel may flow from left inner tank 102 to right inner fuel tank 104. In particular, fuel may flow from left inner fuel tank 102 through valve window 512. From valve window 512, fuel may flow via shaft 504 through valve window 514 to right inner fuel tank 104.

Position sensor 502 may be adapted to determine the position of shaft 504 within intelligent crossfeed valve 116. In various embodiments, position sensor 502 may be a linear variable differential transformer (LVDT). Position sensor 502 may be able to determine an operating status of intelligent crossfeed valve 116, such as the amount in which intelligent crossfeed valve 116 is open. For example, using position sensor 502, it may be possible to determine that intelligent crossfeed valve 116 is closed, that intelligent crossfeed valve 116 is fully open, that intelligent crossfeed valve is 25% open allowing fuel to flow from right inner fuel tank 104 to left inner fuel tank 102; that intelligent crossfeed valve 116 is 35% open allowing fuel to flow from left inner fuel tank 102 to right inner fuel tank 104; and so on. Any positions of intelligent crossfeed valve 116 (i.e., from 0% open to 100% open) are equally plausible and contemplated in this disclosure.

This operating status of intelligent crossfeed valve 116 may be provided to alert system 500. Alert system 500 may be a controller or a system including a controller configured to provide alerts, an engine-indicating and crew-alerting system (EICAS), an electronic centralized aircraft monitor (ECAM), or the like. Alert system 500 may be connected to position sensor 502. The operating status of intelligent crossfeed valve 116 may also be provided to engine control 506. Engine control 506 may be a controller or a control system including a controller, such as a full authority digital engine control (FADEC), an electronic engine control (EEC), or the like. Engine control 506 may be connected to position sensor 502. Position sensor 502 may provide the operating status of intelligent crossfeed valve 116 to alert system 500 and/or engine control 506.

Figure 6:
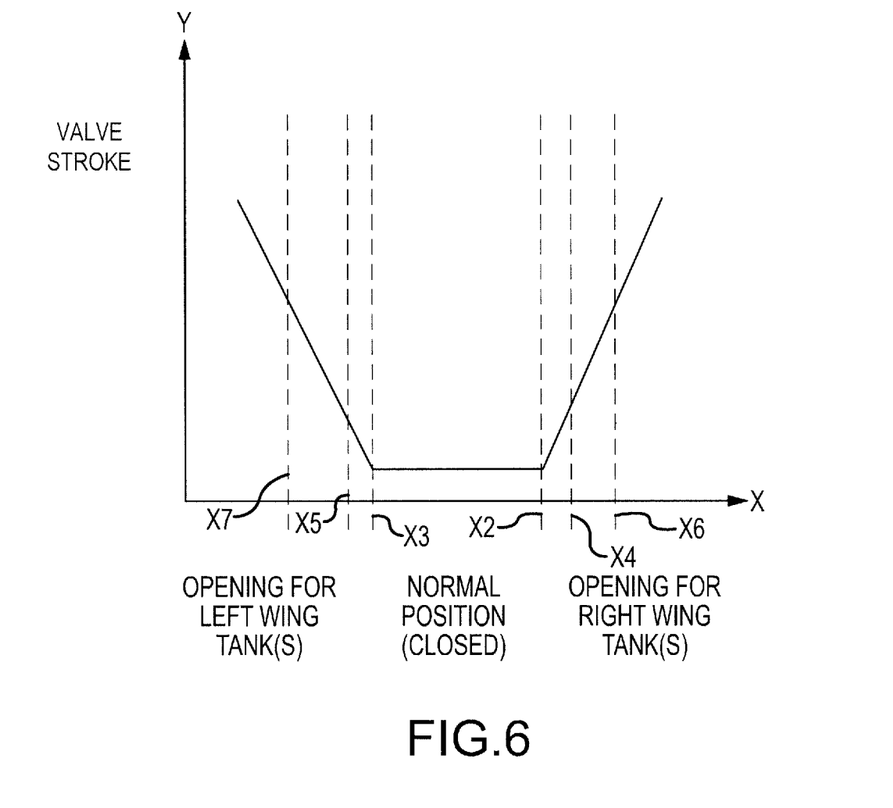
FIG. 6 illustrates different positioning of a shaft within an intelligent crossfeed valve, in accordance with various embodiments.

The alert system 500 and/or the engine control 506 may be adapted to take action in response to receiving certain operating status of intelligent crossfeed valve 116. For example, alert system 500 may provide an amount of displacement of fuel through crossfeed valve 116 to engine control 506. FIG. 6 illustrates different positioning of shaft 504 within intelligent crossfeed valve 116. The X axis illustrates the position of shaft 504 within intelligent crossfeed valve 116 and the Y axis illustrates the valve stroke of intelligent crossfeed valve 116. Between position X2 and X3, intelligent crossfeed valve 116 is in a closed position. In this closed position, no fuel is flowing within intelligent crossfeed valve 116.

From position X2, as shaft 504 moves towards position X6, the valve stroke increases until intelligent crossfeed valve 116 is allowing maximum flow from left inner tank 102 to right inner tank 104. In response to shaft 504 moving towards position X7 from position X3, the valve stroke increases until intelligent crossfeed valve 116 is allowing maximum flow from right inner fuel tank 104 to left inner fuel tank 102.

Between position X2 and position X4, the position of shaft 504 within intelligent crossfeed valve 116 allows fuel to flow. Position X4 is a position in which intelligent crossfeed valve 116 is open an amount less than the maximum amount. Similarly, between position X3 and X5, intelligent crossfeed valve 116 is open an amount less than the maximum amount. A first predetermined amount to which intelligent crossfeed valve 116 may be open may be when shaft 504 is positioned between position X2 and position X4 and/or between position X3 and position X5. The operation of intelligent crossfeed valve 116 within these positions may be considered a normal operation of intelligent crossfeed valve. This is because intelligent crossfeed valve 116 is occasionally required to allow small amounts of fuel to be displaced between left inner fuel tank 102 and right inner fuel tank 104 in order to balance fuel within left inner fuel tank 102 and right inner fuel tank 104. In response to intelligent crossfeed valve 116 being within these positions, alert system 500 may generate an alert, such as a caution alert, to be provided to an operator of the aircraft. The alert signal may indicate which direction fuel is flowing through intelligent crossfeed valve 116 and an amount to which intelligent crossfeed valve 116 is open. The caution alert may be stored (i.e., with a signal such as "latched" caution upon WOW=1) in a flight recorder for later observation instead of, or in addition to, being provided to operator. The amount to which intelligent crossfeed valve 116 is open may also be sent to engine control 506.

Between position X4 and X6, intelligent crossfeed valve 116 may allow more fuel to flow than between position X2 and X4, but not a maximum amount of flow. Likewise, between position X5 and X7, intelligent crossfeed valve 116 may allow more fuel to flow than between position X3 and X5 but not a maximum amount of flow. A second predetermined amount to which intelligent crossfeed valve 116 may be open may be when shaft 504 is positioned between position X4 and X6 and/or between position X5 and X7. Fuel flow within intelligent crossfeed valve 116 within these positions may be an abnormal amount of fuel flow. This may disrupt balance (i.e., "flight attitude") of the aircraft. In response to intelligent crossfeed valve 116 being within these positions, alert system 500 may generate an alert, such as a warning alert. The warning alert may indicate an amount to which intelligent crossfeed valve 116 is open and a direction of fuel flow. The warning alert may be stored in a flight recorder for later observation instead of or in addition to being provided to the operator. The warning alert or a similar signal may be sent to engine control 506.

When shaft 504 reaches position X6, intelligent crossfeed valve 116 may be allowing a greater amount of fuel flow than between X4 and X6. Similarly, when shaft 504 reaches position X7, intelligent crossfeed valve 116 may be allowing a greater amount of flow than between X5 and X7. A third predetermined amount to which intelligent crossfeed valve 116 may be open may be when shaft 504 is positioned when shaft 504 is open at position X6 or greater or position X7 or greater. When shaft 504 is open at position X6 or greater or position X7 or greater, it may be an indication that intelligent crossfeed valve 116 is allowing too much fuel to flow. This may also indicate that intelligent crossfeed valve 116 is allowing one of the inner fuel tanks to fill a leak within the other inner fuel tank. In this situation, the leak may deplete the fuel if intelligent crossfeed valve 116 continues to allow uninterrupted fuel flow. For example, when shaft 504 is to the right of position X6, allowing fuel to flow from left inner fuel tank 102 to right inner fuel tank 104, a leak within right inner fuel tank 104 may be indicated. It is desirable to prevent fuel flow to a fuel tank having a leak when aircraft 100 is in this state.

In this state, a warning signal may generated by alert system 500 in response to that intelligent crossfeed valve 116 being open at position X6 or greater or position X7 or greater. The warning signal may include an amount to which intelligent crossfeed valve 116 is open and a direction of fuel flow. In various embodiments, based on this warning signal, an operator of the aircraft may send a control signal to intelligent crossfeed valve 116 to close intelligent crossfeed valve (i.e., cause shaft 504 to be between position X2 and X3). Additionally, engine control 506 may generate a warning signal. In various embodiments, in response to engine control 506 generating the warning signal, engine control 506 may send a signal to intelligent crossfeed valve 116 causing intelligent crossfeed valve 116 to close. This ensures that a fuel leak of left inner fuel tank 102 or of right inner fuel tank 104 is not continuously fed fuel.

Figure 7:
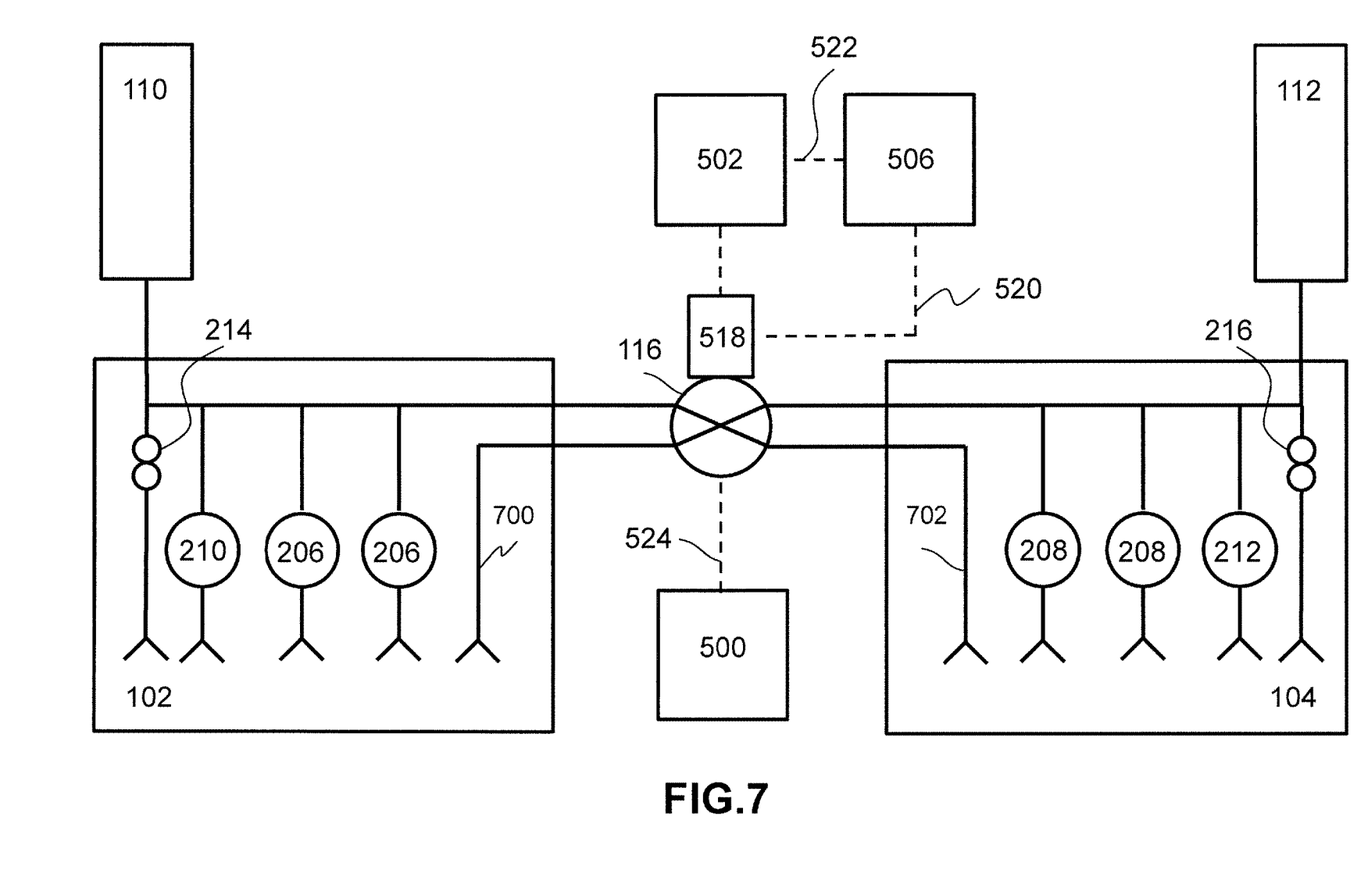
FIG. 7 illustrates a system diagram of the fuel management system, in accordance with various embodiments.

FIG. 7 illustrates a system diagram of the fuel management system, in accordance with various embodiments. As illustrated, left engine (Engine 1) 110 is attached to left main tank 102 via left main fuel pumps 206, left standby fuel pump 210 and left mechanical fuel pump 214. Right engine (Engine 2) 112 is attached to right main tank 104 via right main fuel pumps 208, right standby fuel pump 212 and right mechanical fuel pump 216. Left main tank 102 is connected to intelligent crossfeed valve 116 via left main fuel pumps 206, left standby fuel pump 210 and left mechanical fuel pump 214. Right main tank 104 is connected to intelligent crossfeed valve 116 via right main fuel pumps 208, right standby fuel pump 212 and right mechanical fuel pump 216.

In various embodiments, it may be desirable to shuttle fuel between left main tank 102 and right main tank 104 when the main fuel pumps (and standby fuel pumps) are operational, such as to improve flight attitude. In order to allow this shuttle of fuel between left main tank 102 and right main tank 104, left main tank 102 may be connected to intelligent crossfeed valve 116 via a pipe 700. Pipe 700 may be piping, tubing, or any other device capable of allowing fuel to flow between left main tank 102 and crossfeed valve 116. Similarly, right main tank 104 may be connected to intelligent crossfeed valve 116 via a pipe 702. Pipe 702 may be piping, tubing, or any other device capable of allowing fuel to flow between right main tank 104 and crossfeed valve 116.

In order to transfer fuel between right inner tank 104 and left inner tank 102 while fuel pumps are operational, engine control 506 may engage motor 518. With brief reference to FIG. 5, motor 518 may cause shaft 504 to move into a position to allow fuel to flow via pipe 700 and/or pipe 702.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fuel management system comprising:
    a first fuel tank;
    a second fuel tank;
    an intelligent crossfeed valve positioned between the first fuel tank and the second fuel tank and configured to be open by a first predetermined amount to allow fuel to flow between the first fuel tank and the second fuel tank at a first rate and to be open by a third predetermined amount to allow fuel to flow between the first fuel tank and the second fuel tank at a third rate that is greater than the first rate;
    a sensor configured to detect an amount to which the intelligent crossfeed valve is open; and
    an engine controller connected to the sensor and configured to cause the intelligent crossfeed valve to close in response to the intelligent crossfeed valve being open by the third predetermined amount to reduce the likelihood of providing fuel to a leaking fuel tank.

2. The fuel management system of claim 1, wherein the intelligent crossfeed valve comprises:
    a first valve window configured to receive fuel from the first fuel tank;
    a second valve window in fluid communication with the first valve window and configured to provide fuel to the second fuel tank;
    a third valve window configured to receive fuel from the second fuel tank;
    a fourth valve window in fluid communication with the third valve window and configured to provide fuel to the first fuel tank; and
    a shaft moveably positioned within the intelligent crossfeed valve and configured to allow fuel to flow from the first fuel tank through the first valve window and the second valve window to the second fuel tank and from the second fuel tank through the third valve window and the fourth valve window to the first fuel tank based on a position of the shaft.

3. The fuel management system of claim 1, wherein the sensor is a position sensor.

4. The fuel management system of claim 3, wherein the position sensor is a linear variable differential transformer.

5. The fuel management system of claim 1, further comprising an alert system connected to the sensor and configured to provide a warning signal in response to the intelligent crossfeed valve being open by the third predetermined amount.

6. The fuel management system of claim 5, wherein the alert system is further configured to provide a caution alert in response to the intelligent crossfeed valve being open by the first predetermined amount.

7. The fuel management system of claim 6, wherein the alert system is further configured to provide a warning alert in response to the intelligent crossfeed valve being open by a second predetermined amount that allows fuel to flow between the first fuel tank and the second fuel tank at a second rate that is between the first rate and the third rate.

8. The fuel management system of claim 5, wherein the alert system is at least one of an engine-indicating and crew-alerting system or an electronic centralized aircraft monitor.

9. The fuel management system of claim 1, wherein the engine controller is at least one of a full authority digital engine control or an electronic engine control.

10. The fuel management system of claim 1, further comprising a pipe positioned between the first fuel tank and the second fuel tank and in fluid communication with the first fuel tank and the second fuel tank, wherein the intelligent crossfeed valve is positioned along the pipe.

11. The fuel management system of claim 1, further comprising:
    a first engine;
    a second engine;
    a first fuel pump configured to pump fuel to the first engine from the second fuel tank via the intelligent crossfeed valve; and
    a second fuel pump configured to pump fuel to the second engine from the first fuel tank via the intelligent crossfeed valve.

12. A fuel management system having a first fuel tank and a second fuel tank and comprising:
    an intelligent crossfeed valve having:
        a first valve window configured to receive fuel from the first fuel tank,
        a second valve window in fluid communication with the first valve window and configured to provide fuel to the second fuel tank,
        a third valve window configured to receive fuel from the second fuel tank,
        a fourth valve window in fluid communication with the third valve window and configured to provide fuel to the first fuel tank,
        a shaft moveably positioned within the intelligent crossfeed valve and configured to allow fuel to flow from the first fuel tank through the first valve window and the second valve window to the second fuel tank and from the second fuel tank through the third valve window and the fourth valve window to the first fuel tank based on a position of the shaft such that the intelligent crossfeed valve can be open by a first predetermined amount to allow fuel to flow between the first fuel tank and the second fuel tank at a first rate and can be open by a third predetermined amount to allow fuel to flow between the first fuel tank and the second fuel tank at a third rate that is greater than the first rate based on the position of the shaft, and
        a position sensor configured to detect the position of the shaft; and
    an engine controller coupled to the position sensor and configured to cause the intelligent crossfeed valve to close in response to the intelligent crossfeed valve being open the third predetermined amount to reduce the likelihood of transferring fuel to a leaking fuel tank.

13. The fuel management system of claim 12, wherein the position sensor is a linear variable differential transformer.

14. The fuel management system of claim 12, wherein the position sensor is connected to an alert system of the fuel management system and is configured to provide a displacement of the intelligent crossfeed valve to the alert system based on a position of the shaft.

15. The fuel management system of claim 12, wherein the position sensor is connected to the engine controller of the fuel management system and is configured to provide a displacement of the intelligent crossfeed valve to the engine controller based on the position of the shaft.

* * * * *